United States Patent [19]

Hostetler

[11] 4,185,590

[45] Jan. 29, 1980

[54] WATERING CUP FOR POULTRY AND ANIMALS

[75] Inventor: Eldon Hostetler, Middlebury, Ind.

[73] Assignee: Ziggity Systems, Inc., Middlebury, Ind.

[21] Appl. No.: 836,386

[22] Filed: Sep. 26, 1977

[51] Int. Cl.$^2$ .............................................. A01K 7/02
[52] U.S. Cl. ..................................................... 119/81
[58] Field of Search ........................ 119/81, 75, 72.5; 137/408

[56] References Cited

U.S. PATENT DOCUMENTS

| | | | |
|---|---|---|---|
| 1,228,224 | 5/1917 | Luke et al. | 119/75 |
| 1,584,298 | 5/1926 | Jacob | 119/81 |
| 2,659,347 | 11/1953 | Wear, Jr. | 119/81 |
| 3,563,264 | 2/1971 | Boegli | 119/75 |
| 3,669,077 | 6/1972 | Spierenburg | 119/72.5 |

*Primary Examiner*—Hugh R. Chamblee
*Attorney, Agent, or Firm*—Oltsch, Knoblock & Hall

[57] ABSTRACT

A watering cup for fowl and animals has a telescopic valved and sealed fit of a normally closed valved tubular part of a cup housing within a normally closed valved depending tubular outlet of a water supply line and a hook interlock of said telescoping parts. A cup pivoted in the cup housing below the valved tubular cup part has a projection for opening the valve of the tubular cup housing part and a spring controlled by adjustable tensioning means urges said cup and its projection toward valve opening position when less than a selected quantity of water is contained in the cup.

8 Claims, 8 Drawing Figures

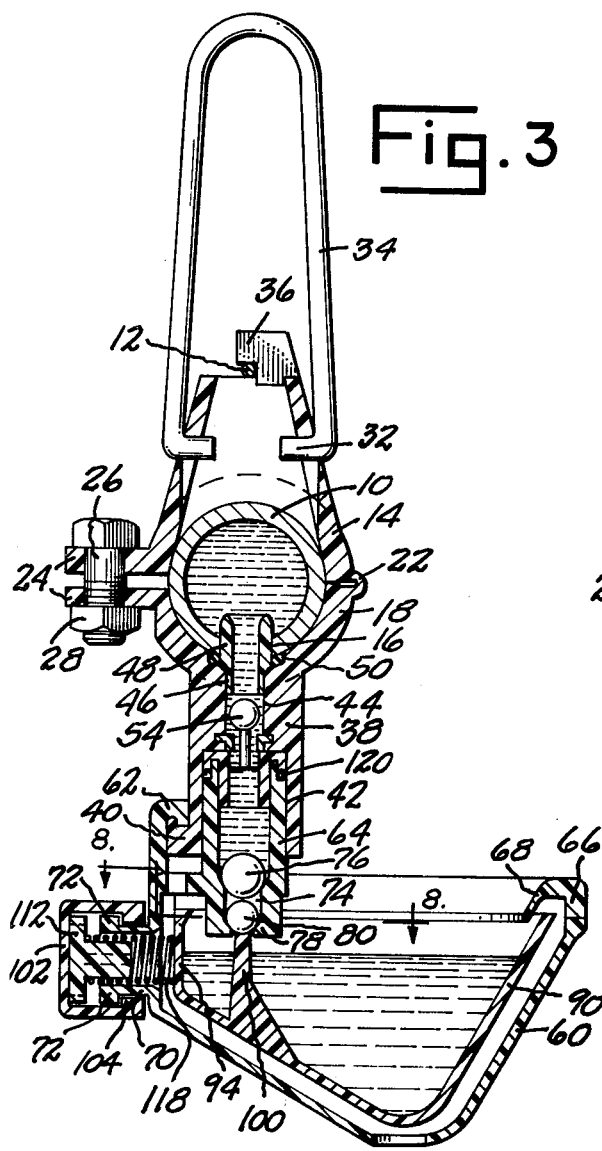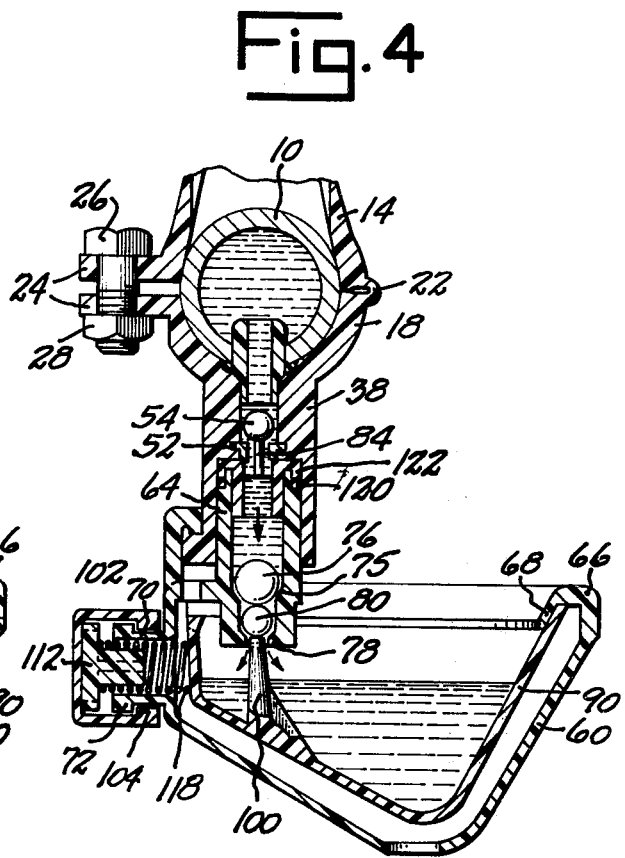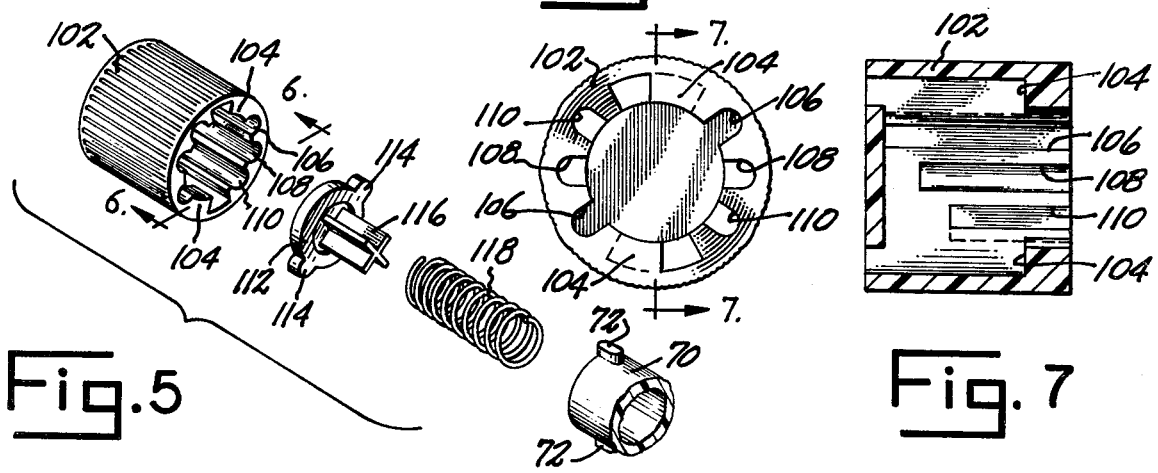

WATERING CUP FOR POULTRY AND ANIMALS

SUMMARY OF THE INVENTION

This invention relates to improvements in watering cups for poultry and animals.

The successful rearing and maintenance of poultry and animals requires availability of a reliable supply of drinking water at all times. Thus, in rearing and maintaining poultry in individual cages, a drinking cup or other source of water must be available in each cage. Not only must the water supply be available, but preferably the amount of the water in the cup should be substantially constant at all times, i.e., should be replenished whenever the supply reaches a predetermined minimum level. Furthermore, it is desirable that the amount of water in a cup or the level of the water in a cup be capable of regulation according to the size of the fowl or animal. Thus, a quantity of water in a cup which would present no problem or hazard for a grown chicken might be a hazard for a small chicken. While these and other desirable characteristics of water cups have been recognized as advantageous heretofore, no watering cup has been available commercially which satisfies or meets these properties and characteristics.

It is the primary object of this invention to provide a watering cup which is simple in construction, inexpensive, adapted for accurate control of the supply of water thereto and easily adjustable for regulation of the quantity of water contained therein.

A further object is to provide a device of this character having a novel valving arrangement providing a dual valve controlling liquid flow to the cup from a supply line.

A further object is to provide a device of this character having a novel means for regulating the tension of a spring associated with valve actuating means to control the quantity of water contained in the cup.

A further object is to provide a watering cup with a novel combination and arrangement of parts wherein a cup is pivotally mounted in a support for movement between predetermined limits, is readily connected to and disconnected from a water supply line, and is protected by its support against pivoting thereof incident to use and to accidental contact by a fowl.

Other objects will be apparent from the following specification.

BRIEF DESCRIPTION OF THE DRAWINGS

FIG. 3 is a vertical sectional view taken on line 3—3 of FIG. 2 and illustrating the device in filled condition.

FIG. 4 is a fragmentary vertical sectional view taken on line 3—3 of FIG. 2 and illustrating the device in filling position.

FIG. 5 is an exploded view of the parts comprising the fill-adjustment means.

FIG. 6 is an end view of an adjustment member as viewed in the direction of the arrow 6—6 in FIG. 5.

FIG. 7 is a sectional view taken on line 7—7 of FIG. 6.

DESCRIPTION OF THE PREFERRED EMBODIMENT

Figure 1:
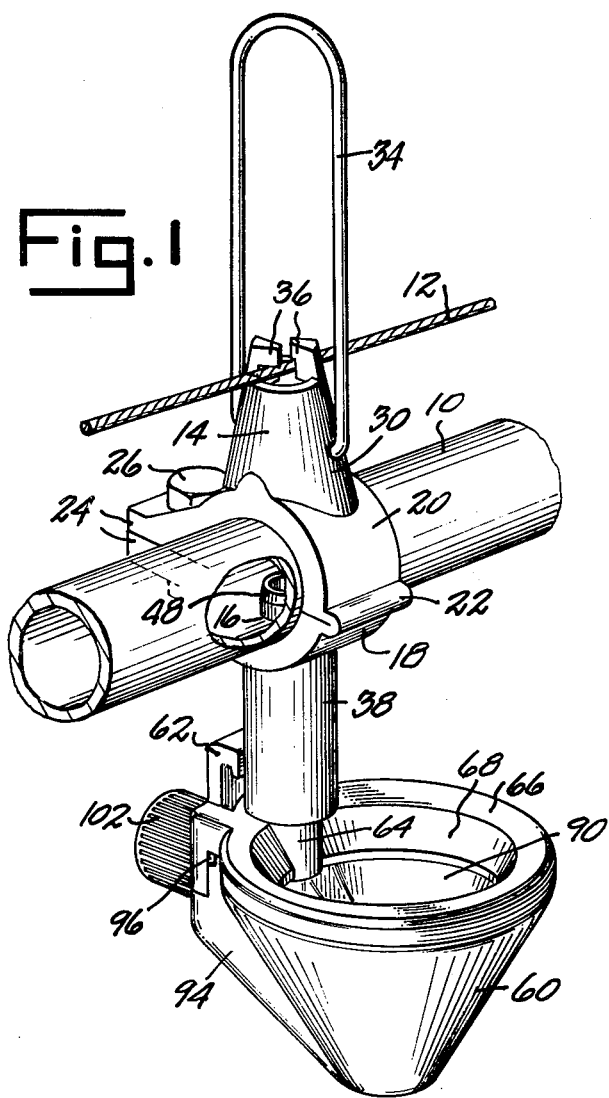
FIG. 1 is a perspective view of the device connected to a water supply line.

This device is adapted for quick attachment to and disconnection from a water supply line at an outlet provided with a valve which is open when the device is attached to the water line and closed when the device is disconnected from the line. The device comprises a housing including a protective enclosure within which a water cup is pivoted. The housing includes a supply valve operable by the cup in one pivoted cup position. The cup is spring urged toward valve opening position and is counterbalanced by water therein which tends to shift the cup to a valve closing position. The spring pressure exerted on the cup is controlled by an adjustment means which regulates the tension of the spring and is readily and easily adjusted.

Referring to the drawings which illustrate a preferred embodiment of the invention, the numeral 10 designates a water supply pipe or conduit which extends substantially horizontally at selected elevation, as through the cages in a poultry house. Pipe 10 is connected to a water supply source which is in open communication therewith so that the pipe is filled with water at all times in which the watering cups are connected or ready for connection. if desired, an electrically charged cable 12 is positioned spaced above the pipe 10 a slight distance, the cable carrying a sufficient charge to shock fowl which contact it while seeking to roost upon the pipe 10. A clamp 14 encircles the pipe 10 adjacent each of a plurality of outlet apertures 16 located in spaced relation at the bottom of the pipe. The clamp 14 includes a lower arcuate pipe-engaging portion 18 and an upper pipe-engaging portion 20. The clamp parts preferable are hingedly connected at 22 and are provided with flanges 24 opposite the hinge 22 and interconnected by suitable securing means, as bolt 26 and nut 28, which cooperate to hold the clamp in firm gripping relation upon the pipe 10. The upper clamp part 20 preferably includes an upward projection 30 which preferably is hollow and is provided with opposed apertures intermediate its height to receive and pivot the inturned end portions 32 of a wire bail 34 which may accommodate suspension of the clamp when connected to a flexible conduit instead of a rigid pipe 10. The projection 30 preferably terminates in a pair of spaced upwardly and inwardly extending hook members 36 so disposed as to cooperate to engage and position the cable 12 in selected spaced relation to the pipe 10. The clamp 14, including the projection 30 and the hooks 36, is preferably formed of non-conductive material, such as a synthetic resin material.

The lower clamp part 18 carries a depending valve and cup mounting member and preferably is characterized by a tubular depending portion 38. Part 38 preferably is formed integrally with the clamp portion 18 and terminates in a laterally outwardly projecting hook portion 40 at its lower or free end extending for a part only of its circumference. Tubular part 38 is characterized by a concentric bore portion 42 of uniform diameter at its lower or free end, and a reduced diameter aligned bore portion 44 at its upper or inner end. At the upper or inner end of the bore portion 44 is mounted the lower portion 46 of a sleeve whose upper portion 48 projects from the inner or concave surface of the clamp part 18 a distance greater than the thickness of the wall of the pipe 10 so as to extend into said pipe. Sleeve part 48 is of an outer diameter having a snug fit in a pipe aperture 16. A sealing ring 50 encircles the sleeve part 48, preferably being seated in a recess in the concave face of the lower clamp part 18. An annular valve seat 52 is anchored in the part 38 adjacent the lower end of the reduced bore portion 44. A ball valve member 54 of a diameter having clearance in the reduced bore part 44 and greater than the diameters of the bores of the lower sleeve part 46 and the valve seat 52 is retained in said bore part 44 and normally is free to move in the bore portion 44 between the parts 46 and 52. The arrangement is such that in all instances in which the clamp is operatively connected with the water supply pipe 10 as described above and the tubular depending part 38 has no member associated therewith or carried thereby, the ball valve 54 will seat at 52 and provide a seal against leakage or discharge of water through the tubular clamp part 38.

A watering cup assembly is mounted on the depending part 38 of the clamp. The watering cup assembly is characterized by a rigid frame or carrier which includes a cup housing 60, an upwardly projecting hook 62 complementary to the hook 40, and a tubular upwardly projecting part 64 spaced from hook 62 and overlying the cup housing 60 with clearance. Part 64 projects into the upper portion of said cup housing at a level below the level of a rim member 66 secured to the upper marginal edge portion of the cup housing 60. Rim 66 is characterized by an inner downturned flange 68 spaced inwardly from the outer marginal portion of the rim. The cup housing 60 also includes a laterally projecting tubular portion 70 preferably formed integrally therewith surrounding a lateral opening preferably substantially directly below the hook portion 68. The lateral tubular part or neck 70 preferably includes a pair of diametrically opposed outwardly extending projections 72 located at the free end thereof and spaced from the portion of the housing 60 from which the neck 70 projects.

The tubular part 64 has a reduced diameter bore portion 74 spaced from its lower end so as to define an internal shoulder 75 intermediate the height of tubular part 64 and defining a valve seat for a ball valve 76. At its lowermost end, the bore of the part 64 is characterized by an annular reduced shoulder-forming valve seat portion 78 on which a ball valve 80 seats. The spacing between the reduced valve seat 78 and the valve seat 75 upon which the ball valve 76 is adapted to seat is sufficient to permit the two ball valves 76 and 80 to have a slight clearance when said valve balls engage their respective seats. A sleeve 82 is mounted in the upper end of the tubular projection 64 and includes an outer inverted annular channel part 122 fitting around the reduced diameter upper end of part 64 and bearing upon a sealing ring 120 encircling part 64 and seating on a shoulder thereof. A pin 84 is carried by and positioned with clearance within the sleeve 82 to project above the upper end of sleeve 82 and through the valve seat 52 with clearance. The pin 84 is of a length to project to a level slightly above the level of the valve seat 52 when the cup housing is assembled or connected in the tubular part 38 of the clamp as illustrated in FIGS. 3 and 4, and thereby holds the ball valve 54 clear of the valve seat 52 and permits liquid flow into the tubular part 64 of the cup housing.

Figure 2:
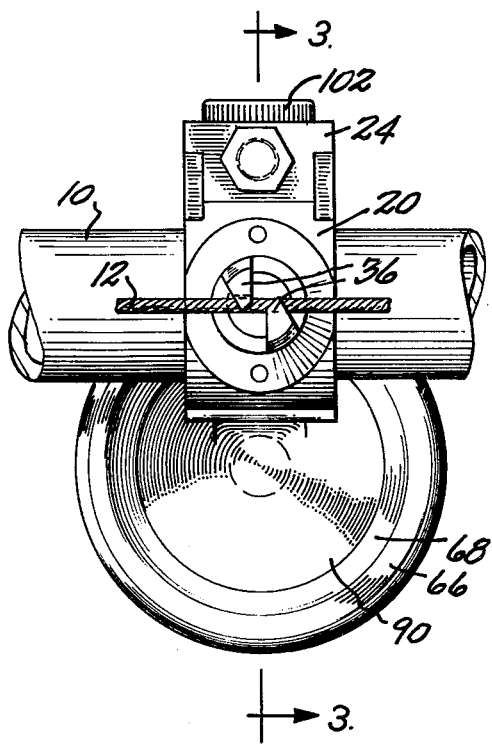
FIG. 2 is a top plan view of the device.
Figure 8:
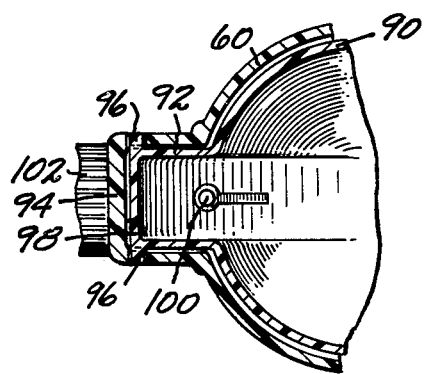
FIG. 8 is a fragmentary sectional view illustrating the pivot mounting of the cap.

A water cup 90 fits with clearance within the cup housing 60–66. The peripheral portion of cup 90 has an inner diameter or dimension slightly greater than the diameter or dimension of the flange 68 and is smaller than the inner diameter or peripheral dimension of the rim 66 of the cup housing so as to fit within the inverted channel defined by the parts 66–68 in all operative positions of the cup. The cup 90 has a laterally projecting part 92 of substantially U-shape as best illustrated in FIG. 8 which fits within a complementary U-shaped portion 94 of the cup housing and is pivoted thereto at pins 96. It will be understood that this construction of the cup is applicable to a unit as illustrated wherein the cup and the cup housing are substantially of circular shape in plan as best seen in FIG. 2. The cup 90 includes wall portion 98 adjacent and substantially between the pivots 96 which confront the bore or opening of the tubular part 70 of the cup housing. The cup 90 also mounts an upwardly projecting pin 100 which is adapted to pass through the valve seat 78 as the cup is pivoted on its pivots 96, from the position illustrated in FIG. 3 toward the position illustrated in FIG. 4, so as to contact the valve ball 80 and successively unseat valve balls 80 and 76 as the cup approaches the pivotal position illustrated in FIG. 4 and thereby permit free flow of liquid into the cup 90. Both the cup 90 and the cup housing 60 may be formed of plastic material of substantially rigid or shape retaining character.

An adjustment cap member 102 is mounted upon the tubular part 70 of the cup housing and is provided with bayonet slot means 104 which accommodate interlock of the cap with the projections 72 on the tube or neck part 70. Cap 102 is provided with a plurality of internal longitudinal slots 106, 108 and 110 which are of different lengths as best illustrated in FIGS. 6 and 7, there preferably being at least two slots of each length arranged in diametrically opposed relation as best seen in FIG. 6. Each of said slots 106, 108 and 110 is open at the end of the cap visible in FIGS. 5 and 6. A cap insert is adjustably mounted within the cap 102 and preferably includes a disc 112 fitting slidably within the cap and having a pair of projections or ears 114 extending radially therefrom and each insertable in a selected one of the cap slots 106, 108 and 110. A longitudinal projection 116 is carried centrally of the cap insert 112 and provides a guide or positioning means for a coil spring 118 whose outer diameter is slightly less than the inner diameter of the housing tube or neck 70. The opposite ends of the spring 118 bear against the cap insert 112 and against the end wall 94 of the cup as best seen in FIGS. 3 and 4. It will be apparent that the rotative position of the cap insert 112 as determined by the slots in which the insert projections 114 seat determines the longitudinal position of the insert 112 within the cap 102 and thereby determines the extent of compression of the spring 118. The amount of water which is contained in the cup 90 acts to counterbalance the tension of spring 118. Thus, when the cup 90 has been pivoted downwardly by the weight of water contained therein against the action of the spring 118 to a position at which the cup pin 100 disengages the ball valve 80 the valves 80 and 76 seat and stop discharge of liquid into the cup. Conversely, when the water level in cup 90 lowers, the spring 118 pivots the cup until pin 100 unseats the valve balls 80, 76 successively.

The construction provides simple means for mounting and dismounting the cup assembly relative to the tubular part 38 of the clamp. The cup assembly is applied to the part 38 by inserting the tubular part 64 of the cup housing into the bore of the clamp part 38 to a position as shown in which the sleeve 82 abuts the shoulder between the parts 42 and 44 of the bore of the clamp part 38. This abutment of parts and the sealing ring 120 provide a liquid seal at the joint between the parts. At the same time the sealed joint is effected the pin 84 unseats the ball valve 54 to establish communication between the bore of the part 64 and the supply pipe 10 through the tubular clamp portion 38. The cup unit is held in the above described interfitting relation by interengagement of the cooperating hook part 40 of the member 38 with hook part 62 of the cup housing. These hooks may be of any selected circumferential extent to ensure that contacts of fowl with the cup housing tending to rotate it will not effect disengagement or release of the cup housing parts 64 from the clamp part 38.

Assuming that the cup will be used with young small chickens, the cap insert 112 will be mounted within the cap 102 with its projections 114 seating in the longest cap slots 106 to effect minimum compression of the spring 18 when the cap is mounted upon and interlocked with the tubular neck 70 of the cup housing. This will result in pivoting of the cup when filled to a predetermined minimum level with water from the supply pipe 10. As the chickens grow to an intermediate size at which more water should be available in the cup, the cap insert 112 may be adjusted to seat its projections 114 in the slots 108 of intermediate length to increase spring tension and the quantity of water required in the cup to overbalance the spring and close valves 80,76. When the chickens reach full size, further adjustment of the cap insert 112 to seat projections 114 thereof in the shortest cap slot 110 produces spring adjustment providing maximum resistance by the spring 118 to pivotal movement of the cup to a position in which its pin 100 disengages the ball valve 80 and thereby ensures that a predetermined maximum filling level of water in the cup will be achieved. Each filling operation occurs as a result of lowering of the liquid level to such an extent that liquid in the cup 90 does not counterbalance the spring resistance and the cup is pivoted by spring 118 to the position illustrated in FIG. 4 to unseat the valves 76 and 80 and thus admit water from the supply pipe 10.

The arrangement of the perimetral flange part 66-68 of the cup housing 60 fitting around the upper margin of the cup 90 in all operative positions protects the cup 90 against the likelihood of application of downward pressure by fowl or animals, as incident to roosting of fowl upon the edge of the cup housing. This feature also is of importance to minimize the entry of foreign material into the cup 90.

While the preferred embodiment of the invention has been illustrated and described, it will be understood that changes in the construction may be made within the scope of the following claims without departing from the scope of the invention.

What I claim is:

1. A watering cup adapted for connection with a water supply line at a valved discharge outlet, comprising
    a cup housing releasably anchored to said outlet in a position to open the valve thereof,
    means sealing the connection of said housing and discharge outlet,
    a water cup pivoted within said housing for limited vertical pivoted movement,
    a normally closed valve carried by said housing,
    actuator means carried by said cup for opening said valve to control the supply of water to said cup,
    cup positioning means carried by said housing including a spring normally urging said cup to a filling position wherein said actuator means on said cup actuates said valve to open position
    said cup being of a size to receive a quantity of water sufficient to overcome the force of said spring and swing said cup to a position disengaging said actuator means from said valve to permit closing of said valve.

2. A watering cup as defined in claim 1, wherein a tubular part of said cup housing is telescoped within the valved outlet of said supply line and houses said normally closed valve.

3. A watering cup as defined in claim 1, wherein said cup positioning means includes means for selectively varying the force of said spring acting to pivot said cup.

4. A watering cup as defined in claim 1, wherein said cup housing includes a projecting neck receiving said spring and means mounted on said neck and adjustably mounting a spring tensioning member.

5. A watering cup as defined in claim 1, wherein said cup housing includes a projecting neck receiving said spring with clearance, a retainer releasably mounted on said neck, and a spring tensioning member adjustably positioned in said retainer.

6. A watering cup as defined in claim 1, wherein said cup housing includes a projecting neck, said spring is a coil extending through said neck, a retainer is removably mounted on said neck, and a spring tensioning member is seated in one of a plurality of predetermined different adjustment positions in said retainer.

7. A watering cup as defined in claim 6, wherein said retainer constitutes a cap releasably anchored on said neck and having a plurality of internal longitudinal slots of different lengths and said spring tensioning member fits in said cap and has a projection seated in a selected cap slot.

8. A watering cup adapted for connection with a water supply line having a downwardly extending tubular outlet having a valve seat gravitally engaged by a ball valve and a lateral external projection,
    a cup housing including a tubular part mounting a normally closed valve and adapted for telescopic sealing interfit with and rotatable in said tubular outlet and including a part unseating said outlet ball valve,
    a locking member carried by said cup housing for interlocking engagement with said external projection of said tubular outlet when said tubular cup housing part telescopically interfits with said outlet and is arranged in predetermined rotative position
    a water cup pivoted to swing vertically in said cup housing and including a part engageable with the valve in said tubular cup housing part to unseat said valve in one pivoted position of said cup,
    and resilient means carried by said cup housing for urging said cup to valve-unseating position when said cup contains less than a selected quantity of water.

* * * * *